July 25, 1933.  A. D. MACLACHLAN ET AL  1,919,375
RUBBER BEARING STRUCTURE
Filed Jan. 10, 1931
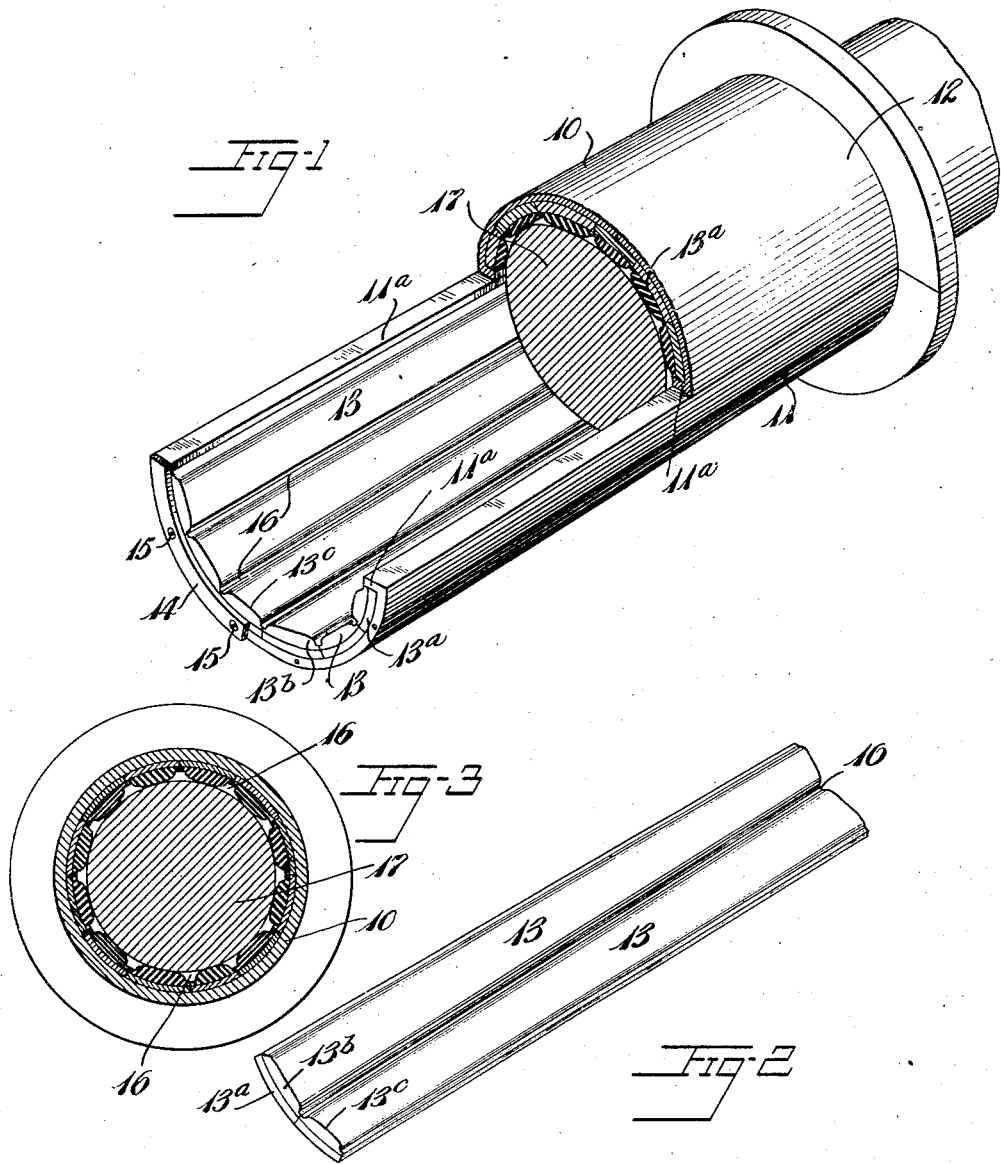
Inventors
Andrew D. Maclachlan
Karl E. Freund
By Eakin & Avery
Attys Patented July 25, 1933

1,919,375

UNITED STATES PATENT OFFICE

ANDREW D. MACLACHLAN AND KARL E. FREUND, OF AKRON, OHIO, ASSIGNORS TO THE B. F. GOODRICH COMPANY, OF NEW YORK, N. Y., A CORPORATION OF NEW YORK

RUBBER BEARING STRUCTURE

Application filed January 10, 1931. Serial No. 507,844.

Our invention relates to bearing structures comprising a member of resilient material such as rubber adapted to engage another member in sliding engagement and especially to water-lubricated bearing structures.

Heretofore such bearing structures usually have been constructed with the resilient bearing portion permanently united to the wall of one of the bearing members with the result that the structure is difficult and expensive to manufacture and to repair.

The objects of the present invention are to reduce the cost of manufacture, to promote economy in the use of bearings and to reduce time consumed in the replacement of the bearing surfaces.

These objects are attained by the device of our invention which is illustrated in the accompanying drawing, in which Fig. 1 is a perspective view of a bearing embodying the principle of our invention in engagement with a shaft, part of the bearing being broken away to more clearly show the construction.

Fig. 2 is a perspective view of two adjacent tapered bearing strips such as are employed in the bearing of our invention, and Fig. 3 is a cross-section of a modified form of the bearing and its cooperating shaft in engagement with each other, the bearing sleeve being of one-piece construction.

Referring to the drawing, the numeral 10 represents a bearing sleeve, made preferably of a plurality of sections, two being shown in Fig. 1, indicated by the numerals 11, 12. The bearing sleeve, or each section thereof, is provided with a concave inner surface for supporting a plurality of bearing strips 13, each comprising a rigid base portion $13^a$ formed of metal, hard rubber, or other suitable material, and a bearing surface portion $13^b$ of soft rubber composition or other suitable resilient material, which contacts with the shaft 17.

For retaining the bearing strips in proper position, when the sleeve is made in sections, each section of the bearing sleeve is provided with marginal flanges such as $11^a$ disposed longitudinally thereof on their inner surfaces. One or more of the bearing strips 13 are tapered in width throughout their length, as illustrated in Fig. 2, and all of said strips are arranged in edgewise abutting relation, as between the marginal flanges $11^a$. One of the tapered strips is inserted last and produces pressure between the abutting edges of the strips, which is resisted by the flanges $11^a$, resulting in the strips being forced outwardly into intimate contact with the sleeve.

Endwise movement of the strips is prevented by providing a removable end flange 14 held by screws 15 to the sleeve section, and a similar flange may be provided on the opposite end of the sleeve.

Each bearing strip 13 is provided with a soft rubber bearing portion $13^b$ having a shaft-contacting face $13^c$ of non-concentric form. The surface $13^c$ may be a plane surface tangential to the shaft-surface or a convex surface. In either case the surface $13^c$ meets the shaft-surface at an acute angle and thereby assures proper lubrication as the acute angular approach of the surfaces tends to cause the shaft to wipe the water or other lubricant into the bearing. The bearing strips are decreased in thickness near their edges so that they define longitudinal lubricant channels 16 located between their shaft-contacting faces and extending throughout the length of the bearing.

By forming the bearing sleeve in a plurality of sections it is possible to replace worn bearings without removing the shaft and one worn section may be withdrawn and replaced without replacing sections which are not worn. This is of particular advantage where the shaft is disposed horizontally, as in marine vessels where such bearings are used on propeller shafts and the weight of the shaft causes greater wear on the lower half of the bearing than on the upper half. In such cases a great saving is accomplished by making the bearing in halves as shown in Fig. 1 and replacing only the lower half in case of wear.

A further saving is accomplished by providing removable bearing strips, as shown and described, in combination with the split sleeve construction, as the strips may be removed and replaced either without removing the bearing sleeve section or by removing a sleeve section and then replacing such strips as are worn.

We claim:

1. A bearing structure comprising a bearing sleeve section and a set of bearing strips seated only on the inner curved face thereof, each of said strips having a soft rubber shaft-contacting portion forming an acute angle with the surface of the shaft and being removable longitudinally from the sleeve section in sliding engagement therewith.

2. A bearing structure comprising a bearing sleeve section provided with marginal flanges and a set of bearing strips seated only on the inner curved face of said section between said flanges, each of said strips having a soft rubber shaft-contacting portion forming an acuate angle with the surface of the shaft and being removable longitudinally from the sleeve section in sliding engagement therewith.

3. A bearing structure comprising a bearing sleeve section, a set of bearing strips seated only on the inner curved face of said section in edgewise abutting relation, and means retaining the bearing strips on said section against rotative movement in relation thereto, at least one of said strips being tapered laterally to hold the strips in abutting relation in the sleeve section.

4. A bearing structure as defined in claim 3 in which a removable end flange is provided on said sleeve section for retaining the strips against longitudinal motion.

5. A bearing structure comprising a sleeve section having a cylindrical curved inner face and a set of bearing strips seated only on the inner curved face thereof, each of said strips having a soft rubber shaft-contacting portion forming an acute angle with the surface of the shaft and being removable longitudinally from the sleeve in sliding engagement therewith, and a plurality of said strips directly abutting each other and being seated against the said cylindrically curved surface and held thereagainst as elements of an arch.

ANDREW D. MACLACHLAN.
KARL E. FREUND.